I. N. PHIPPS.
EGG CARTON OR CASE.
APPLICATION FILED JAN. 3, 1914.
1,150,384.
Patented Aug. 17, 1915.
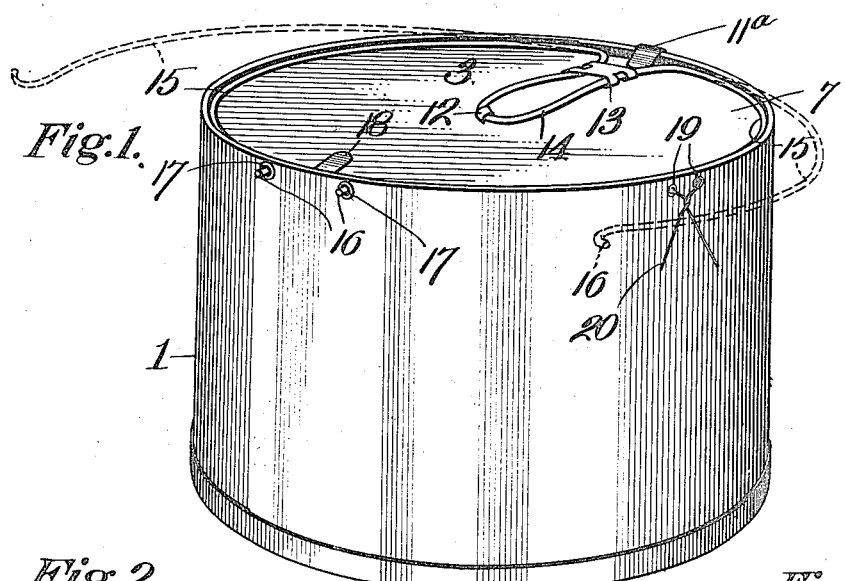
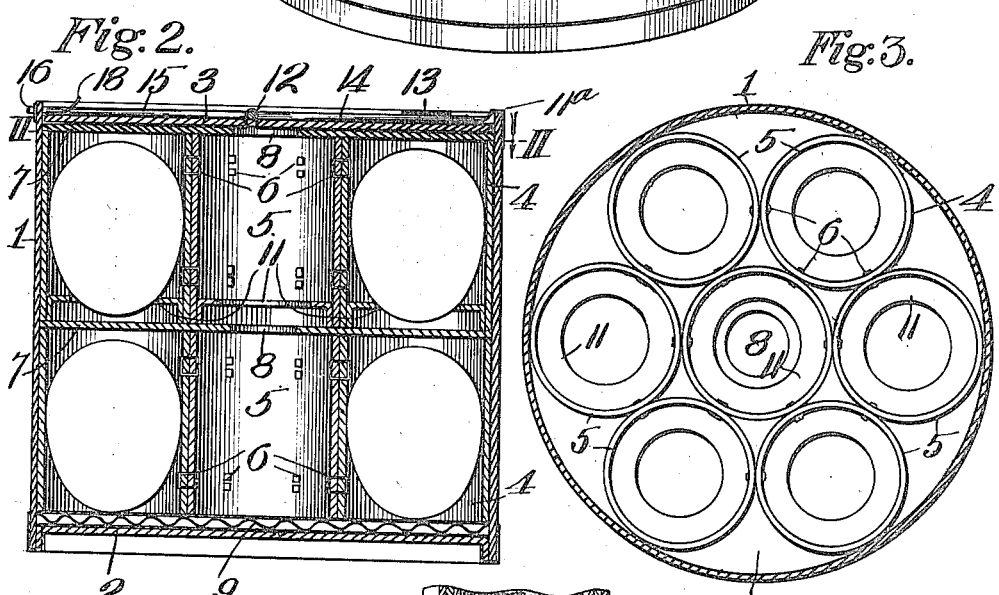
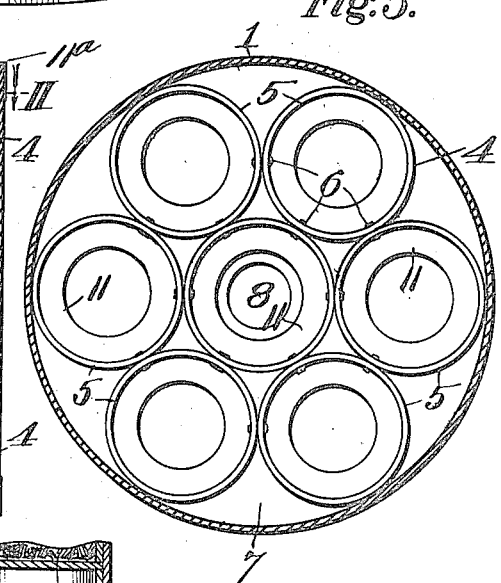
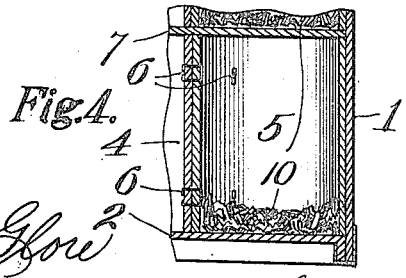
WITNESSES:
Frank R. Howe
H. C. Rodgers
INVENTOR
I. N. Phipps
BY
George Thorpe
ATTORNEY

UNITED STATES PATENT OFFICE.

ISAAC N. PHIPPS, OF CHANUTE, KANSAS, ASSIGNOR OF ONE-HALF TO C. B. AMYX, OF CHANUTE, KANSAS.

EGG CARTON OR CASE.

1,150,384.      Specification of Letters Patent.      Patented Aug. 17, 1915.

Application filed January 3, 1914. Serial No. 810,119.

*To all whom it may concern:*

Be it known that I, ISAAC N. PHIPPS, a citizen of the United States, residing at Chanute, in the county of Neosho and State of Kansas, have invented certain new and useful Improvements in Egg Cartons or Cases, of which the following is a specification.

This invention relates to shipping cases for eggs and has for its object to produce a simple, strong, durable and inexpensive case wherein eggs may be safely shipped and handled without danger of breakage.

With this and other objects in view, the invention consists in certain novel and peculiar features of construction and organization as hereinafter described and claimed; and in order that it may be fully understood reference is to be had to the accompanying drawing, in which—

Figure 1, is a perspective view of a shipping case, embodying my invention. Fig. 2, is a central vertical section of the same. Fig. 3, is a horizontal section on the line II—II of Fig. 2. Fig. 4, is a fragmentary vertical section of the case as provided with a different form of cushion from that shown in Fig. 2.

In the said drawings, the shell 1 of the device may be of any desired form but preferably is cylindrical as shown, and is formed with a permanent bottom 2, and a removable top 3 secured in position by fastening devices hereinafter described.

Arranged in the case in tiers are skeleton frames 4 composed of individual egg-receiving cells 5 which are preferably of cylindrical form as shown and secured together by staples or equivalent fastening devices 6, it being noted that the fastening devices are arranged above and below the horizontal centers of the cells so that the eggs standing endwise in the cells cannot come in contact with the fastening devices should they be of such character that contact therewith might fracture the shell.

The case may be of any desired proportion and may contain any desired number of tiers of frames 4, and above and resting upon each frame is a horizontal partition 7 having a perforation 8 through which one's finger may be thrust to effect the removal of the partition. Underlying each egg is a cushion adapted for yielding slightly to protect the egg upon it from breakage, the overlying partition guarding against any possibility of the eggs in adjacent tiers striking together in the event the case is jolted from any cause. The cushion underlying the bottom tier of eggs is in the form of a round piece of corrugated cardboard 9, which possesses the cushioning property; is light in weight and takes up but little space. For the next and all other tiers of eggs, a similar cushion may be employed, or a small quantity of excelsior or analogous packing 10, may be stuffed in the lower ends of the cells, as shown in Fig. 4.

For small shipping cases such for instance as may be employed for shipping eggs direct to the consumer, I preferably provide a cushion for each egg in the form of a perforated bottom 11, the egg resting on the cushion and protruding through the perforation thereof, it being noted that the cushion is disposed a sufficient distance above the bottom of the cell to prevent the lower end of the egg protruding below the cell. The egg is therefore supported out of contact with the underlying partition 7.

One of the chief advantages of a cushion of the type just described, is that when an egg carrying frame is removed all of the eggs therein are carried with it, whereas with a cushion such as 9, or 10, the frame is removed without withdrawing the eggs thereon. The topmost partition 7 protects the eggs from breakage at that point.

The top 3 is adapted to fit snugly within the upper end of the shell 1 and at one point fits under what may be termed a catch 11ª, and secured by clips 12 and 13 or otherwise to the upper or outer side of the top is a spring catch made from a piece of spring wire bent to form a centrally doubled portion 14 which extends radially of the top and is secured firmly thereto by the said clips, and a pair of curved arms 15 which are bowed in opposite directions and terminate in outturned hooks 16. The tendency of these arms is to spring apart and hence when they are compressed and fitted down upon the top and against the inner side of the shell they tend to hold the top in place, and to guard against their dislocation the hook terminals 16 extend through holes 17 in the shell. By thus interlocking the spring arms to the shell it is impossible for the top to be removed until the hooks 16 are forced back through the openings 17, after which the operator may, by pulling upward on handle 18 secured to the top at a point in line with portion 14 of the fastening device, effect the withdrawal of the top, the upward pull on handle 18 obviously resulting in sliding the opposite edge of the top from under the catch 11ª. The manipulation of the top and of the fastening devices is reversed to resecure the top in place.

As it is of prime importance that a case of this character shall be as light as possible consistent with the requisite strength and rigidity to withstand rough handling, it is contemplated making the case of cardboard, especially for the smaller cases. The same material of course may be used for larger cases though wood or any other suitable material may be employed and as it is desired to repeatedly use cases of this character, I preferably provide the shell with a pair of holes 19 through which a wire or cord 20 may be passed for convenience in attaching a shipping tag, as the case would soon become unsightly if tags were pasted thereon.

A case of the character outlined in addition to the other advantages enumerated, possesses the desirable feature of compactness.

It is to be understood that while I have illustrated and described the preferred embodiments of the invention, I do not desire to be restricted to the details of construction shown and described, but reserve the right to make all changes falling within the spirit and scope of the appended claims.

I claim:

A shipping case for eggs, having a pair of openings in and near the upper edge of the wall of the case, a plate secured to the wall of the case at a point diametrically opposite said pair of openings, and arranged with one end projecting inwardly over the wall, tiers of egg-receiving frames within the case, a partition upon the topmost tier of frames, a top upon the partition and underlying the inwardly-projecting end of said plate and a fastening device upon and secured to the said top and provided with hooks engaging said openings and curved portions bearing against the inner surface of the wall of the case at opposite sides of the latter.

In testimony whereof, I affix my signature, in the presence of two witnesses.

ISAAC N. PHIPPS.

Witnesses:
F. E. BODLEY,
J. E. WOOD.